March 25, 1952 C. COHEN ET AL 2,590,510
APPARATUS FOR MAKING CHEESE
Filed Dec. 15, 1949 2 SHEETS—SHEET 2
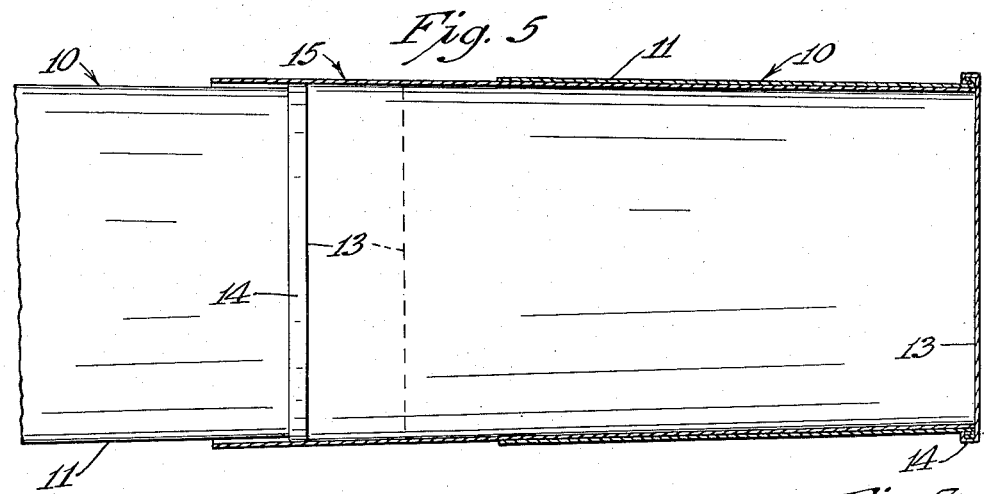
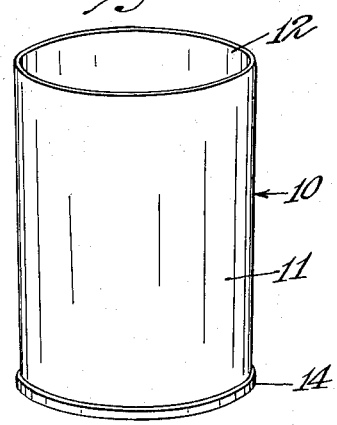
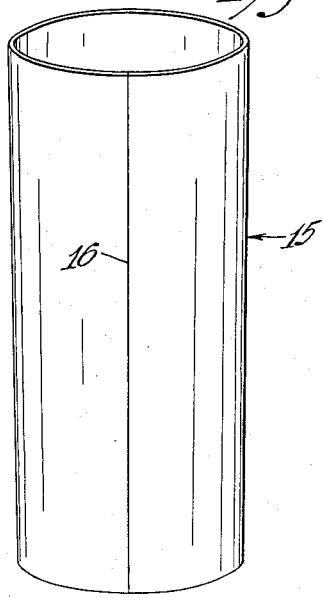
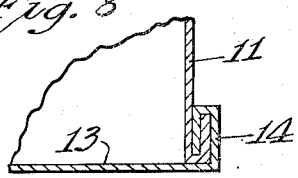
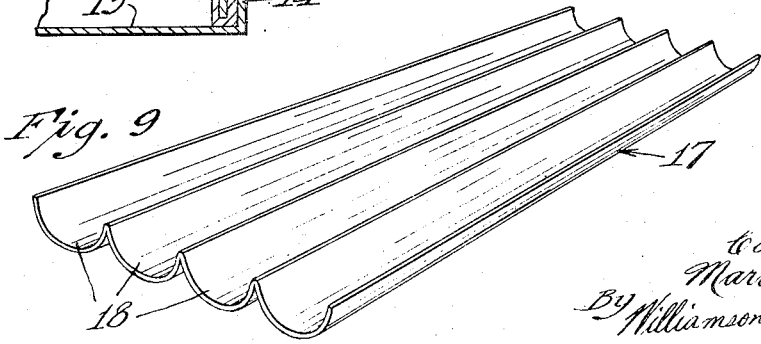
Inventors
Carl Cohen
Marvin L. Cohen
By Williamson & Williamson
Attorneys Patented Mar. 25, 1952

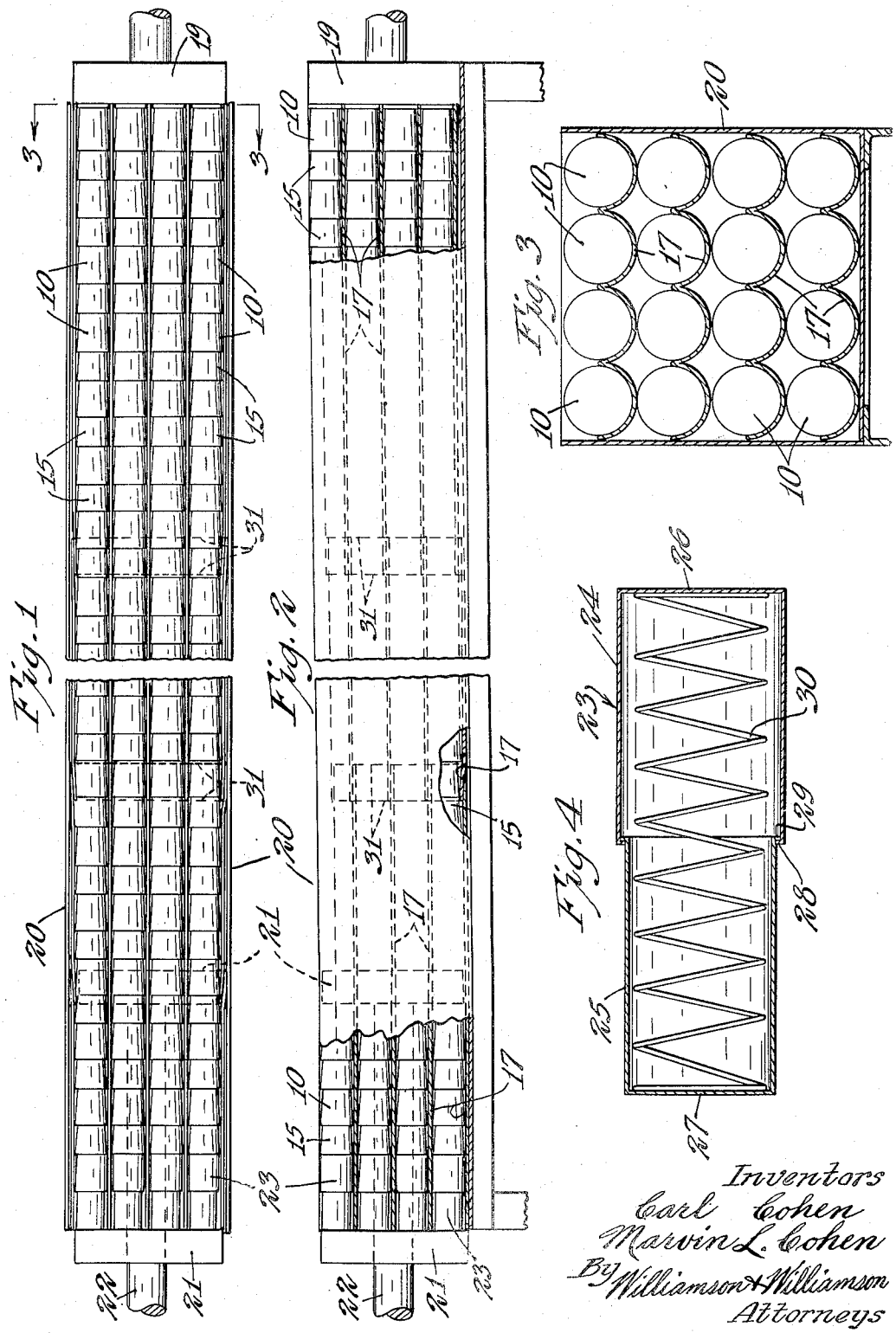

2,590,510

UNITED STATES PATENT OFFICE 2,590,510

APPARATUS FOR MAKING CHEESE

Carl Cohen and Marvin L. Cohen, Waupaca, Wis.

Application December 15, 1949, Serial No. 133,125

8 Claims. (Cl. 100—55.5)

This invention relates to apparatus for making cheese and is particularly adapted for use in making small cheeses in a simple and speedy manner so that the production of smaller cheeses is economically feasible.

It is a general object of the invention to provide cheese molding apparatus of cheap and simple construction for economically molding cheeses of small size with a minimum of labor and utilizing the conventional cheese press.

It is more specifically an object of the invention to provide a flaring type of cheese cup hoop equipped with an exterior flange on the smaller end of the same whereby during the molding of the cheese curd the smaller end of one cup may be placed within the larger end of another cup and the flange at the smaller end of the first cup will act as a follower to compress the cheese curd with a minimum of leakage of curd as the cheeses are compressed in a press.

Another object of the invention is to provide an improved structural combination of cup shaped hoop and a split insertable sleeve which considerably facilitates the ease and speed of production of cheeses in multiple.

A further object of the invention is to provide means whereby multiple cheeses can be formed and wherein substantially equal pressures can be applied on the curd during the pressing or molding process.

The above and other objects and advantages of the invention will more fully appear from the following description made in connection with the accompanying drawings, wherein like reference characters refer to the same parts throughout the views, and in which:

Fig. 1 is a plan view of cheese molding apparatus showing a multiplicity of individual units in a standard cheese press;

Fig. 2 is a side elevational view of the structure shown in Fig. 1 with portions broken away and other portions in section;

Fig. 3 is a section on an enlarged scale taken approximately on the line 3—3 of Fig. 1;

Fig. 4 is an enlarged longitudinal vertical sectional view through a dummy end member used in the press;

Fig. 5 is an enlarged sectional view through a single hoop and sleeve unit with the end of a second hoop shown in elevation;

Fig. 6 is a perspective view of the improved hoop;

Fig. 7 is a perspective view of the removable sleeve;

Fig. 8 is an enlarged fragmentary detail of the flange of the hoop; and

Fig. 9 is a perspective view of one of the trays.

Our improved hoop includes a cup shaped frustro-conical member 10 having a side wall 11, an open top 12, a closed bottom 13 and a radially outwardly disposed bottom flange 14. The flange 14 is formed by rolling or beading the bottom edge of the side wall 11 and the circumferential edge of the bottom 13. It is preferred that this flange or bead 14 be formed substantially rectangular as shown in Figs. 5 and 8, and the diameter of the bottom including the flange 14 preferably rather closely approximates the inner diameter of the open opposite end 12 of said hoop 10. Actually, the flanged end should be slightly smaller so that it will fit into a cooperating hoop having a removable sleeve inserted therein, the sleeve to be described below.

The removable sleeve is shown at 15. It is frustro-conical in shape and is provided with a longitudinal split 16. The slant or angle of the walls of the sleeves 15 is preferably the same as the angle of the side walls of the hoop 10, and the length of the sleeve is considerably greater than the height of said hoop.

In Figs. 3 and 9 hoop and sleeve supporting trays 17 are shown. Each tray is so shaped that it provides a plurality of upwardly open generally semi-circular troughs 18. The width of each trough 18 is such that a hoop 10 and an inserted sleeve 15 will relatively closely fit the cross-sectional shape of the trough, but will be readily slidable longitudinally of the trough. The length of each tray 17 is preferably a multiple of the lengths of several hoop and sleeve units.

In Figs. 1 and 2 we have illustrated the general elements of a conventional cheese press. This structure includes a movable or stationary abutment member 19 fitting within a long trough 20 resting on a suitable supporting bed. Fitting within the other end of the trough 20 is a ram 21 mounted on a piston rod 22.

In Fig. 4 there is illustrated a dummy end member 23 which is adapted to be inserted at one end of each of the individual horizontal stacks of hoop and sleeve units shown in Figs. 1 and 2. It includes a pair of telescoping cylindrical sections 24 and 25 having their outer ends 26 and 27 closed. Their telescoping ends are provided with cooperating flanges 28 and 29 respectively, so that the sections cannot be completely separated, but full collapsing movement is permitted. Mounted in the cylindrical sections 24 and 25 is a coil spring 30 which is under compression and bears against the inner sides of the end members 26 and 27, thereby yieldably urging the sections 24 and 25 apart.

When it is desired to mold a large number of small cheeses simultaneously a series of trays 17 are first placed in the large trough 20 of the press in substantial alignment to extend between the abutment member 19 and the ram 21. A sufficient number of these trays 17 are employed so that the end portion of one tray overlaps the adjacent end portion of its neighbor tray and the overlapping is made in the same direction. As shown in Figs. 1 and 2, the left end portion of the trays 17 to the right overlie the right hand end portions of the adjacent trays 31 to the left. This is so that the steps formed by the overlaps at the upper sides of the trays will not catch on the hoop and sleeve units which are later placed within the trays.

The sleeves 15 are inserted individually in complementary hoops 10 and the assembled unit is filled with the cheese curd. When a succeeding sleeve and unit is filled with curd the closed end of the hoop of the suceeding unit is inserted in the outer end of the sleeve 15 of the previous unit filled and eventually a stacked or nested line of the filled hoop and sleeve units is built up in each trough 18 of the aligned trays 17 until the space between the abutment member 19 and the ram 21 of the press is substantially filled by the aligned and nested units. When a series of the trays 17 at one level have been filled with the nested hoop and sleeve units containing the curd another group of trays 17 is placed over the nested units within the large trough 20 to rest on the underlying nested units. Thereupon, additional nested hoop and sleeve units containing the cheese curd are placed within the then uppermost unfilled trays 17 and the structure is thus built up in the trough 20 until the trough is either completely filled or brought to the desired level. It will be noted that in the drawing each tray 17 is made to take four lines of stacked curd-filled hoop and sleeve units and there are four tiers of the trays 17 so that sixteen lines of filled units will be simultaneously compressed. The number of troughs 18 formed in the individual trays 17 can be varied, of course, and the number of tiers of trays can be varied depending on the capacity of the press and the number of small cheeses it is desired to compress at one time.

It should be noted that as shown in Figs. 1 and 2 of the drawings, the outer or open ends of the hoops 10 and sleeves 15 face to the left so that during compression of the press they connot catch against the overlapped edges of the different trays 17.

Preferably at the end of each line of stacked units in the troughs 18 adjacent the ram 21 one of the spring loaded dummies or fillers 23 is placed which bears at one end against the ram 21 and at its other end against the adjacent sleeve 15. These spring loaded dummies 23 are provided to more or less equalize the pressure on each nested line of hoops and sleeves because it is not always possible to exactly fill each sleeve and hoop unit with the same amount of curd. Of course, these dummies may be eliminated if the hoop and sleeve units are filled with exact precision. The dummies permit the compression of a plurality of lines of filled sleeve and hoop units at the same time by single actuation of the press.

When the apparatus has been filled as shown in Figs. 1 and 2, the ram 21 is forced toward the abutment 19 whereby the aligned trays 17 are forced toward each other at the same time that pressure is applied to the lines of nested sleeve and hoop units. As pressure is applied, the flange 14 of one hoop 10 being received within the larger end of the sleeve 15 of its neighbor unit acts as a follower to compress the cheese curd in the neighboring unit. The curd in all the various units is thus compressed simultaneously.

At length the curd in the various hoops is thoroughly compressed, the whey running out of the curd into the various trays 17 and draining therefrom through the sliding joints between the various trays.

After the compression of the curd the ram 21 and the abutment 19 are drawn apart whereupon the hoops 10 and sleeves 15 and such of the trays 17 as is necessary to get at the various hoops and sleeves are removed from the trough 20. The hoops 10 carrying the sleeves 15 are then withdrawn from neighboring units and the sleeves 15 carrying the molded cheeses with them are then individually withdrawn from the hoops 10. These sleeves may be made so that they are under some spring pressure to expand outwardly from the compressed position shown in Fig. 7, in which case they will immediately strip from the cheeses leaving the cheeses free for wrapping. If the sleeves are not so constructed that they will spring apart along the longitudinal split 16 they may be readily forced apart to withdraw the cheeses from the sleeves. After removal from the sleeves 15 the stripped cheeses are individually wrapped in cloths, replaced in the sleeves 15 and the sleeves are replaced in the hoops 10 and the hoops are renested in adjacent sleeves on the trays 17 within the large trough 20 in the same general condition as after compression by the press. The press is then operated again. Thereafter the cheeses immediately or after a waiting period are again stripped from the hoops and sleeves and the cloth is removed. After the cheeses have been stripped and dried they may be dipped in wax or otherwise treated and thereafter they are ready to be marketed.

It has been found that with our apparatus it is possible to produce small cheeses such as two pound "Long Horns" at a profit with no limit to volume. The apparatus permits the production of the same total weight in small cheeses as large ones in the same length of time. Other types of pressing or molding apparatus such as used conventionally for "Long Horns" include several pieces in their individual hoop units. Some of them have follower discs which are removable from the hoops themselves and others have removable bands about the sleeves employed. Our apparatus, however, includes individual units comprising merely a one piece hoop (in its operative and finished form) and a one piece sleeve with no separable attachments. Consequently our apparatus cuts down the handling of individual pieces for each cheese by at least one-third and this, of course, is of tremendous importance in quantity production because of the time and labor saved.

The flange 14 formed on the bottom of the hoop is a feature which permits relative close fitting of the frustro-conical hoop bottom into the top of a next adjacent sleeve in such a way that the curd does not press past the bottom of the hoop. This construction also facilitates separation of the nested hoops after the compression operation.

The telescoping tray arrangement and the nesting arrangement of the hoops and sleeves permits the compression of the curds for a great number of small individual cheeses during a single operation of the press. If the loaded dummy or filler elements 23 are employed, pressure can be equalized on the different lines of units utilizing the ordinary cheese press now commonly employed at cheese factories.

It is also possible at some disadvantage to eliminate the sleeves 15, in which case to make the cheese of corresponding length to those made with the sleeves the hoops 10 will be lengthened.

It will, of course, be understood that various changes may be made in the form, details, arrangements, and proportions of the various parts without departure from the scope of our invention, which, generally stated, consists in the matter shown, and described, and set forth in the appended claims.

What we claim is:

1. Apparatus for making cheeses including a frustro-conical hoop having its smaller end provided with a bottom and its larger end open, said smaller end having an annular flange extending radially outwardly, and a split sleeve of greater length than that of said hoop and removably receivable therein and extending to the bottom thereof, said sleeve being flexible to assume the general shape of said hoop when inserted therein to form a curd receiving unit, and the bottom and finage of one unit being receivable within and closely fitting the sleeve of an adjacent similar unit to form a follower around which the curd in the adjacent unit cannot escape during compression of the curd.

2. The structure defined in claim 1 and said hoop comprising a side wall section and a bottom section, and said flange comprising an outstanding bead formed from the bottom edge of said side wall section and the circumferential edge portion of said bottom section.

3. Apparatus for making cheeses including a frustro-conical hoop having its smaller end provided with a bottom and its larger end open, said smaller end having an external flange the lower surface of which extends in the same plane as the lower surface of said bottom and approximating in external diameter the internal diameter of the larger end, and a split sleeve of greater length than that of said hoop and removably receivable therein to form therewith a closed curd receiving unit, said sleeve being flexible to assume the general shape of said hoop when inserted therein, and the bottom and flange of one unit being receivable within the sleeve of an adjacent similar unit to form a follower around which the curd in the adjacent unit cannot escape during compression of the curd.

4. The structure defined in claim 3, said split sleeve being frustro-conical in shape.

5. Apparatus for making cheeses including a plurality of troughed trays adapted to be placed in generally aligned tiers between an abutment member and a ram of a cheese press with the adjacent ends of the trays in respective tiers in overlapped relation, and a multiplicity of frustro-conical curd receiving hoop units adapted to be placed in alignment to rest within the channels of the trays with the smaller end of one hoop unit received within the larger end of an adjacent hoop unit, said hoop units having closures at their smaller ends and being open at their larger ends.

6. Apparatus for making cheeses having in combination a plurality of troughed trays adapted to be placed in generally aligned tiers between an abutment member and a ram of a cheese press with the adjacent ends of the trays in respective tiers in overlapped relation, a multiplicity of frustro-conical curd receiving hoops having open larger ends and closed bottoms at their smaller ends, a frustro-conical curd receiving sleeve for each hoop having a smaller end received within the larger end of the hoop, and extending at least the full length of said hoops said hoops carrying said sleeves being adapted to be assembled in aligned relation within the troughs of said trays with the smaller end of one hoop fitting within the larger end of the sleeve received by the next adjacent hoop.

7. Apparatus for molding cheese having in combination a plurality of trays adapted to be placed in end to end overlapping relation to each other and extend longitudinally between an abutment member and a ram of a cheese press, a plurality of frustro-conical curd receiving hoops each open at its large end and having a bottom closing its smaller end, sleeves open at both ends and being split longitudinally and of dimensions adapting them to fit snugly within the hoops with inner ends abutting the bottoms of the hoops and outer ends projecting from the open ends of the hoops, pairs of assembled hoops and sleeves being disposed longitudinally upon the tray with the small ends of the hoops fitting into the outer ends of adjoining sleeves and having margins of their bottoms in close fitting contact with walls of the sleeves into which they fit.

8. Apparatus for molding cheese having in combination a plurality of trays adapted to be placed in end to end overlapping relation to each other and extend longitudinally between an abutment member and a ram of a cheese press, a plurality of pairs of companion curd receiving hoops and sleeves, the hoop of each pair being open at one end and at its other end being closed by a bottom surrounded by a flange extending circumferentially about the hoop in radially outstanding relation thereto, the sleeve of each pair being open at both ends and of dimensions adapting ito to fit snugly within its companion hoop with its inner end abutting the bottom of the said hoop and its outer end projecting from the hoop, the pairs of assembled hoops and sleeves being disposed upon the trays in longitudinal alignment with the closed ends of hoops fitting into the sleeves of adjoining pairs through the outer ends thereof and the flanges of the said hoops in close fitting engagement with the walls of the sleeves into which they fit.

CARL COHEN.
MARVIN L. COHEN.

REFERENCES CITED

The following references are of record in the file of this patent:

UNITED STATES PATENTS

| Number | Name | Date |
|---|---|---|
| 957,778 | Lawrence | May 10, 1910 |
| 1,286,386 | Mixa | Dec. 3, 1918 |
| 1,502,377 | Davies | July 22, 1924 |
| 2,016,488 | Eckhaus | Oct. 8, 1935 |
| 2,083,318 | Damrow | June 8, 1937 |
| 2,518,188 | Ryser | Aug. 8, 1950 |